United States Patent [19]

Iida et al.

[11] Patent Number: 5,622,051

[45] Date of Patent: Apr. 22, 1997

[54] AXLE DRIVING APPARATUS WITH COOLING TUBING

[75] Inventors: Masaru Iida; Kenichi Takada, both of Amagasaki, Japan

[73] Assignee: Kanzaki Kokyukoki Mfg. Co., Ltd., Hyogo-Ken, Japan

[21] Appl. No.: 494,734

[22] Filed: Jun. 26, 1995

[51] Int. Cl.⁶ .................................................. F16D 31/02
[52] U.S. Cl. ......................... 60/456; 60/487; 74/606 A
[58] Field of Search .................................. 60/456, 488, 484, 60/396, 912, 487; 74/606 A; 475/161; 184/6.22, 104.1; 165/56

[56] References Cited

U.S. PATENT DOCUMENTS

| | | | |
|---|---|---|---|
| 690,641 | 1/1902 | Davis | 475/161 X |
| 2,474,706 | 6/1949 | Wahlmark | 60/456 X |
| 2,553,380 | 5/1951 | Putt | 60/456 |
| 2,668,417 | 2/1954 | Gleasman | 60/456 |
| 2,936,589 | 5/1960 | Quintilian | 60/456 X |
| 3,175,354 | 3/1965 | Firth et al. | 60/396 X |
| 3,362,161 | 1/1968 | Flint | 60/488 |
| 3,528,311 | 9/1970 | Fieber . | |
| 3,727,712 | 4/1973 | Colloton | 180/305 |
| 3,791,148 | 2/1974 | Alcock et al. | 60/912 X |
| 3,999,387 | 12/1976 | Knopf | 60/488 X |
| 4,179,888 | 12/1979 | Goscenski, Jr. | 60/456 X |
| 4,198,819 | 4/1980 | Bourne | 60/456 X |
| 4,325,452 | 4/1982 | Bando et al. | 60/488 X |
| 4,461,341 | 7/1984 | Morrison | 60/456 X |
| 4,756,208 | 7/1988 | Hayashi et al. . | |
| 5,078,659 | 1/1992 | von Kaler et al. . | |
| 5,090,949 | 2/1992 | Thoma et al. . | |
| 5,107,718 | 4/1992 | Inagawa | 74/606 A X |
| 5,125,291 | 6/1992 | Makita et al. . | |
| 5,142,940 | 9/1992 | Haseqawa | 60/487 X |
| 5,165,468 | 11/1992 | Tajima et al. | 60/912 X |
| 5,177,967 | 1/1993 | Von Kaler et al. | 60/487 |
| 5,182,966 | 2/1993 | Von Kaler et al. | 60/487 X |
| 5,191,813 | 3/1993 | Havens | 60/487 X |
| 5,289,738 | 3/1994 | Szulczewski . | |
| 5,335,496 | 8/1994 | Azuma et al. . | |
| 5,394,699 | 3/1995 | Matsufuji | 60/487 X |
| 5,412,947 | 5/1995 | Hirose | 60/487 X |

FOREIGN PATENT DOCUMENTS 60-89453  6/1985  Japan .

Primary Examiner—John E. Ryznic
Attorney, Agent, or Firm—Sterne, Kessler Goldstein & Fox P.L.L.C.

[57] ABSTRACT

An axle driving apparatus of the present invention consists of a hydrostatic transmission for driving a vehicle. The transmission is so designed that a fan is disposed on a power input shaft so as to cool a housing as well as cooling tubing or an oil passage disposed between the fan and the upper surface of the housing. The housing of the axle driving apparatus is filled with lubricating oil, used on the gears and bearings of the power transmission from the hydrostatic transmission to the axles, and operating oil, used in the pump and motor of the hydrostatic transmission. The oil circulates within the tubing or the oil passage. Cooling the oil passing in the tubing or the oil passage prevents a deterioration in efficiency of the axle driving apparatus.

38 Claims, 18 Drawing Sheets

AXLE DRIVING APPARATUS WITH COOLING TUBING

BACKGROUND OF THE INVENTION

1. Field of the Invention

The present invention relates to a simple construction for cooling operating oil filling a housing for an axle driving apparatus for transmitting a variable speed drive force from a hydrostatic transmission to axles.

2. Related Art

It is well known to dispose a cooling hose in the vicinity of a fan driven by power from an engine and send operating oil from a hydrostatic transmission to the cooling hose to thereby cool the operating oil. This is disclosed in, for example, U.S. Pat. Nos. 3,727,712; 3,362,161 and in Japanese Utility Model Laid-Open Gazette No. Sho 60-89453.

The above-mentioned examples are constructed so that only the operating oil used for the hydrostatic transmission is cooled, while the temperature of the lubricating oil for lubricating gears or shafts housed in the housing rises, leading to a temperature rise of the housing itself. When this lubricating oil serves as operating oil, and the oil is used in an external hydraulic actuator, the temperature of the operating oil may increase so much as to cause a malfunction.

SUMMARY OF THE INVENTION

The present invention is designed to cool the oil used in an axle driving apparatus which inputs power from an engine, or the like, to a hydrostatic transmission which changes the speed thereof to drive a vehicle. To accomplish this objective, a fan is disposed on a power input shaft of the hydrostatic transmission to cool the housing of the hydrostatic transmission as the power input shaft rotates. A tube or an oil passage is disposed between the fan and the upper surface of the housing. Oil, filled in the housing for lubricating gears or bearings in a power transmission or supplied as the operating oil in the hydrostatic transmission, circulates in the tube or the passages in order to cool down the oil. A large number of fins are disposed on the outer periphery of the tube or the oil passage. The cooling prevents deterioration of the efficiency of the axle driving apparatus.

These and other objects of the invention will become more apparent in the detailed description and examples which follow.

DETAILED DESCRIPTION OF THE PREFERRED EMBODIMENTS

Figure 1:
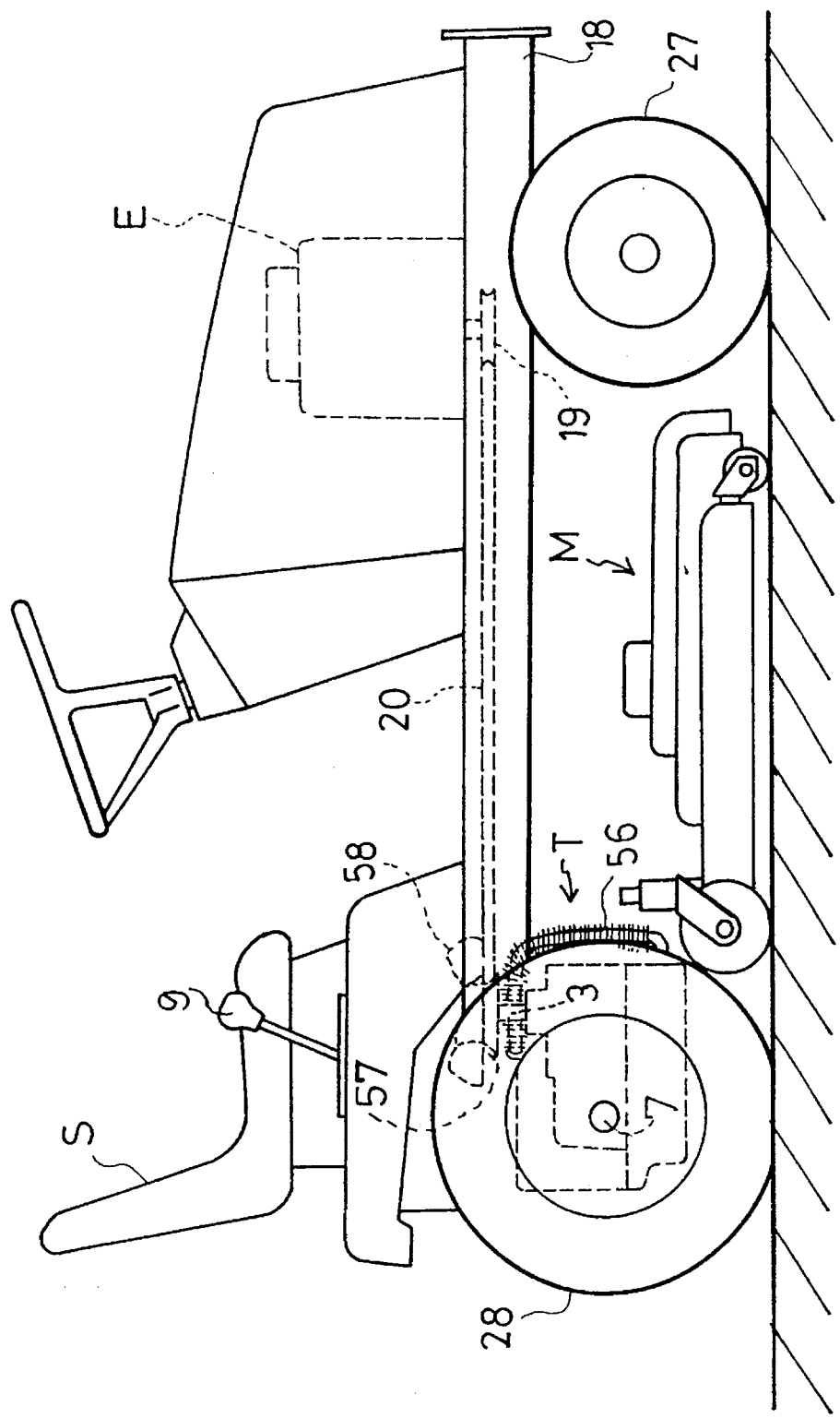
FIG. 1 is a side elevational view of a lawn mower with an axle driving apparatus of the present invention disposed thereon.

An axle driving apparatus of the present invention will be described as situated on a lawn mower or similar vehicle. The lawn mower has a vertical crank shaft type engine E or prime mover on the front portion of a body frame 18. A crank shaft downwardly projects from engine E with an output pulley 19 attached. A seat S is disposed on the rear portion of body frame 18. The axle driving apparatus T of the present invention is disposed at the lower portion of body frame 18. Axles 7 project from both lateral sides of the housing of axle driving apparatus T. Rear wheels 28 are mounted to axles 7. Front wheels 27 are suspended at the lower, front portion of body frame 18. A power input shaft 3 vertically extends from axle driving apparatus T. An input pulley 57 and a fan 58 are fixed onto input shaft 3. A belt 20 is wound across output pulley 19 and input pulley 57 so that the axle driving apparatus T can be driven by power from engine E. A mower M is disposed under the center of body frame 18 between rear wheels 28 and from wheels 27. The mower is adapted to be raised and lowered.

An upper half casing 1 and a lower half casing 2 are joined along their horizontal joint surfaces to form the single housing of axle driving apparatus T (see FIGS. 2–5). The housing is filled with operating oil for a hydrostatic transmission. This oil also serves as lubricating oil for gears and shafts and fills an oil sump. Bearings for a motor shaft 4 and a counter shaft 26 are constituted at the joint surfaces of upper half casing 1 and lower half casing 2. The bearings for axles 7 are constituted in upper half casing 1 above the joint surfaces of upper half casing 1 and lower half casing 2. This bearing arrangement is disclosed in U.S. Pat. No. 5,335,496.

A center section 5, which is L-shaped when viewed from the side in cross-section, is fixed at joint surfaces of upper half casing 1 and lower half casing 2, inside upper half casing 1. The upper, horizontal surface of center section 5 forms a pump mounting surface 40. A cylinder block 16 constituting a hydraulic pump is mounted on pump mounting surface 40. Cylinder block 16 is adapted to rotate. A plurality of pump pistons 13 are inserted into a plurality of cylinder bores in cylinder block 16. The pistons are adapted to advance and retract. The lower surface of a thrust bearing, fitted onto a movable swash plate 8, abuts against the heads of the pump pistons 13. A pump shaft extends upwardly from the center of rotation of cylinder block 16 and projects out of upper half casing 1 so as to form power input shaft 3.

A side surface of center section 5 forms a hydraulic motor mounting surface 41. A cylinder block 17 constituting a hydraulic motor is mounted on surface 41. Cylinder block 17 is adapted to rotate. A plurality of motor pistons 12 are inserted into a plurality of cylinder bores in cylinder block 17. Pistons 12 are adapted to advance and retract. The heads of motor pistons 12 abut against a swash plate 37 which is fixed between upper half casing 1 and lower half casing 2. Motor shaft 4 engages with the center of rotation of cylinder block 17.

Movable swash plate 8 is connected to a speed change operation tool 9, such as a lever or pedals equipped on the vehicle (see FIG. 1). The contact angle of movable swash plate 8 is adjusted from a neutral position to change the oil discharge amount and direction from the hydraulic pump. The hydrostatic transmission is constituted to obtain stepless speed adjustment of the hydraulic motor.

Motor shaft 4 is provided with a gear 25 which engages with elements of a power transmission including a larger diameter gear 24 on the counter shaft 26 (see FIG. 3), and a smaller diameter gear 21, also on counter shaft 26, which engages with a ring gear 22 of a differential gear unit 23. Power inputted into ring gear 22 is transmitted to left and right axles 7 through differential gear unit 23.

Figure 2:
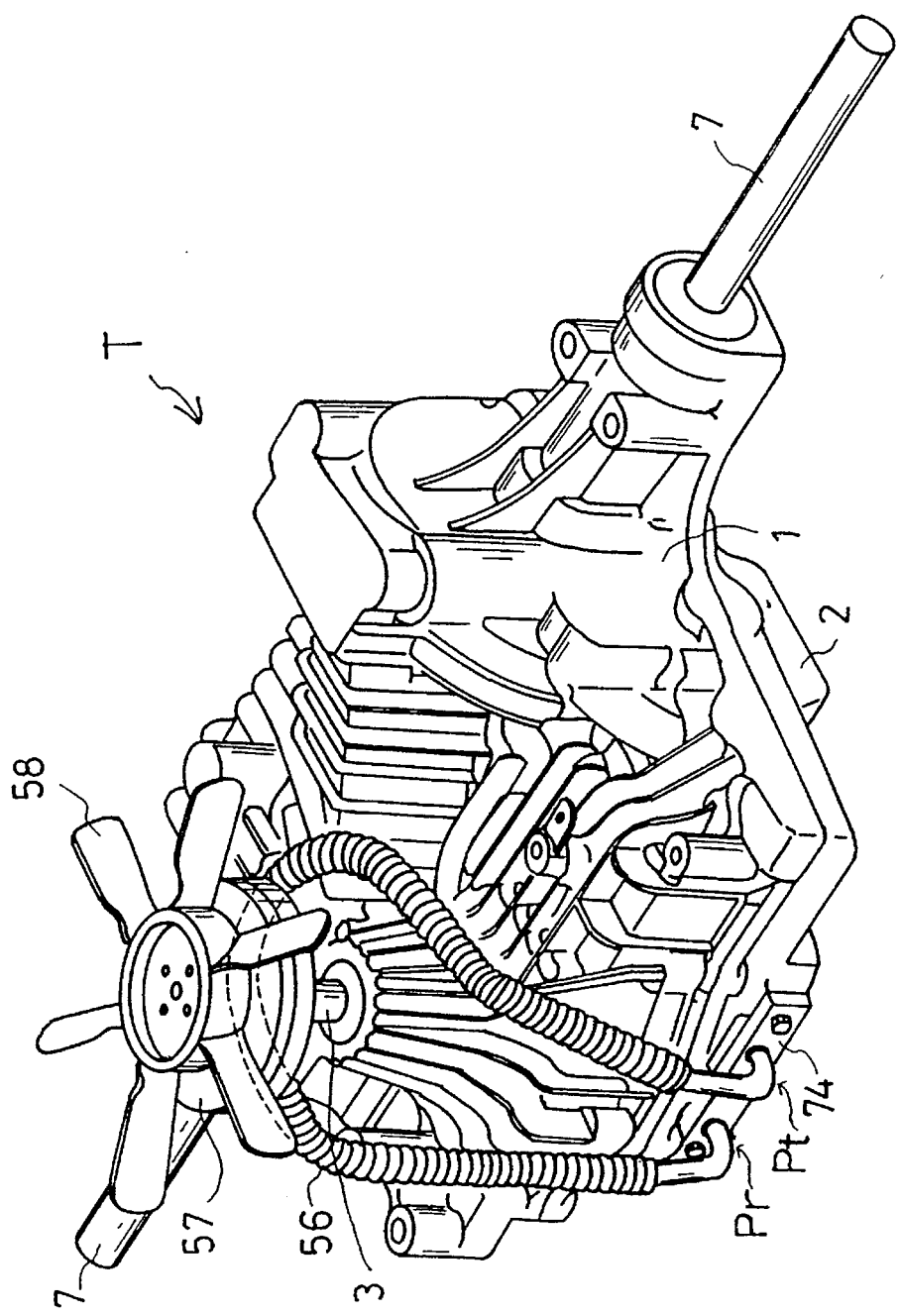
FIG. 2 is a perspective view of a first embodiment of the axle driving apparatus of the present invention.
Figure 4:
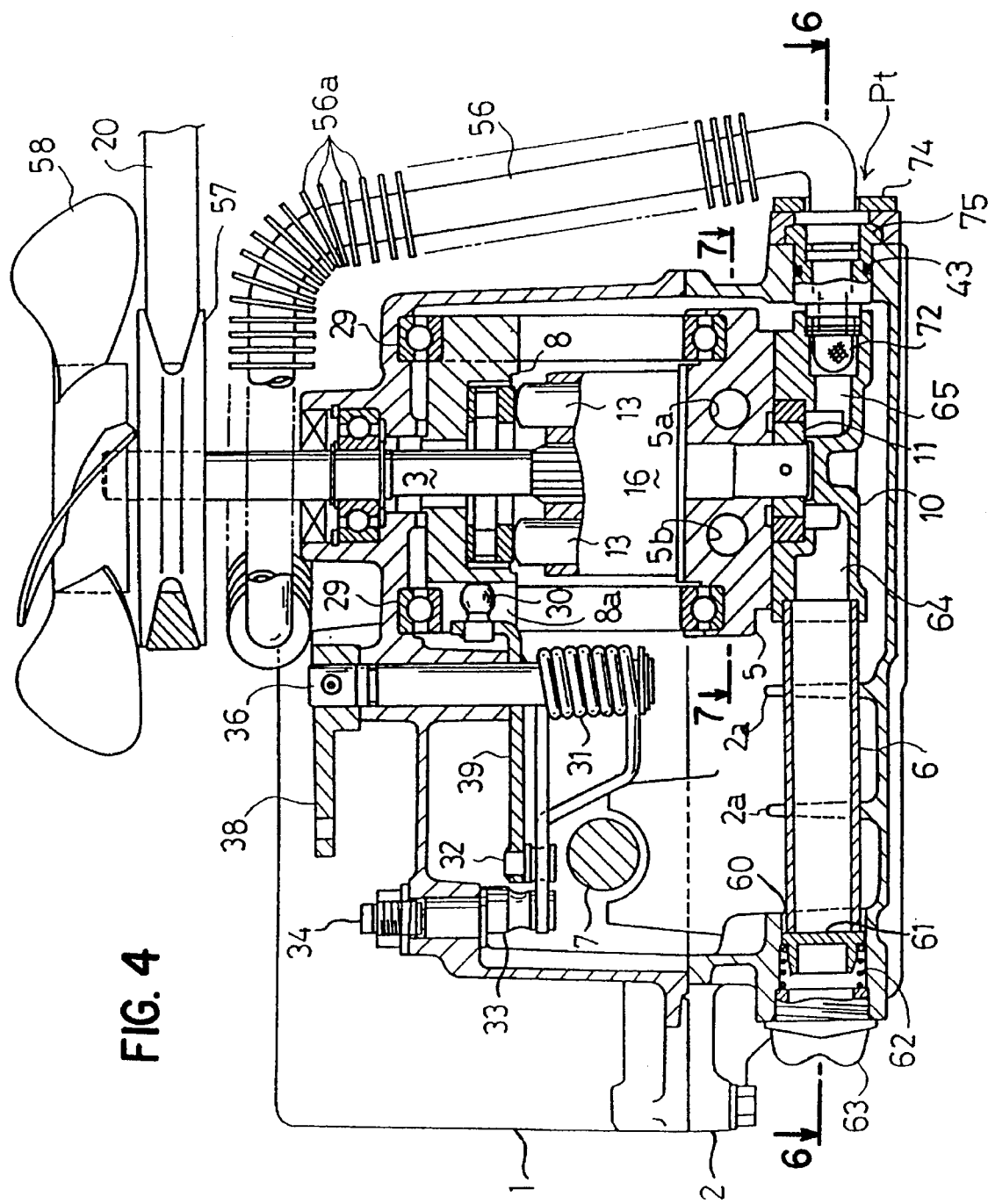
FIG. 4 is a cross-sectional view of the axle driving apparatus taken along line 4—4 in FIG. 3.
Figure 5:
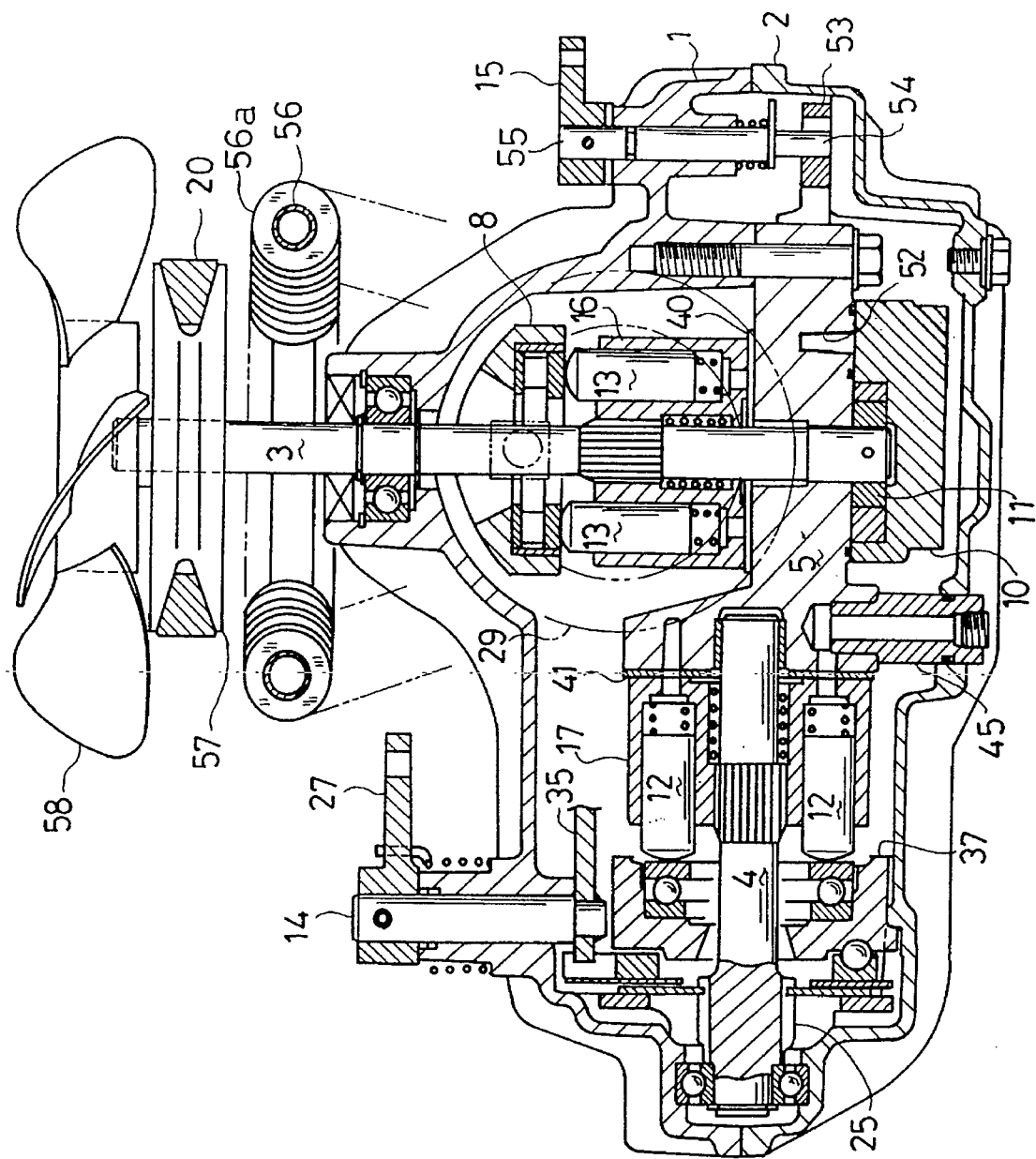
FIG. 5 is a cross-sectional view of the axle driving apparatus taken along line 5—5 in FIG. 3.

The sides of movable swash plate 8, as shown in FIGS. 2, 4 and 5, are fitted into inner rings of bearings 29, which are fixed between upper half casing 1 and the center section 5. A vertical speed-change shaft 36 is supported through upper half casing 1. A speed change lever 38 is fixed to the upper end of speed change shaft 36 outside the housing, and an arm 39 is fixed to the lower end of speed change shaft 36 within the housing. A ball member 30 is fixed to one end of arm 39. Ball member 30 engages with a joint block interposed between a pair of projections 8a at the movable swash plate 8. When ball member 30 rotates horizontally, movable swash plate 8 moves slantwise around the center of each bearing 29, so that a change of the hydraulic pump output is carried out. Reference numeral 31 designates a neutral return spring which brings movable swash plate 8 back to the neutral position when speed change lever 38 is not operated. One end of neutral return spring 31 is attached to an eccentric pin 33 fixed to the housing and the other end is attached to a pin 32 fixed to arm 39.

Reference numeral 34 designates a neutral position adjusting screw for adjusting the return position of movable swash plate 8 brought about by return spring 31. Eccentric pin 33 is provided at the lower end of neutral position adjusting screw 34. When neutral position adjusting screw 34 rotates, eccentric pin 33 changes the return position of arm 39. Projections 39a and 39b are formed on arm 39 for defining the limit of slant-wise movement of movable swash plate 8 (see FIG. 3).

Arm 39 links with an arm 35 of a brake operating shaft 14 shown in FIG. 5. When brake operating shaft 14 is rotated by a brake arm 27 so as to brake motor shaft 4, movable swash plate 8 is adapted to return to the neutral position.

Arm 35 engages at one end with a pressure member so that when the braking action is exerted, the pressure member is axially moved and a friction plate fixed to motor shaft 4 is biased to actuate the braking effect.

Figure 3:
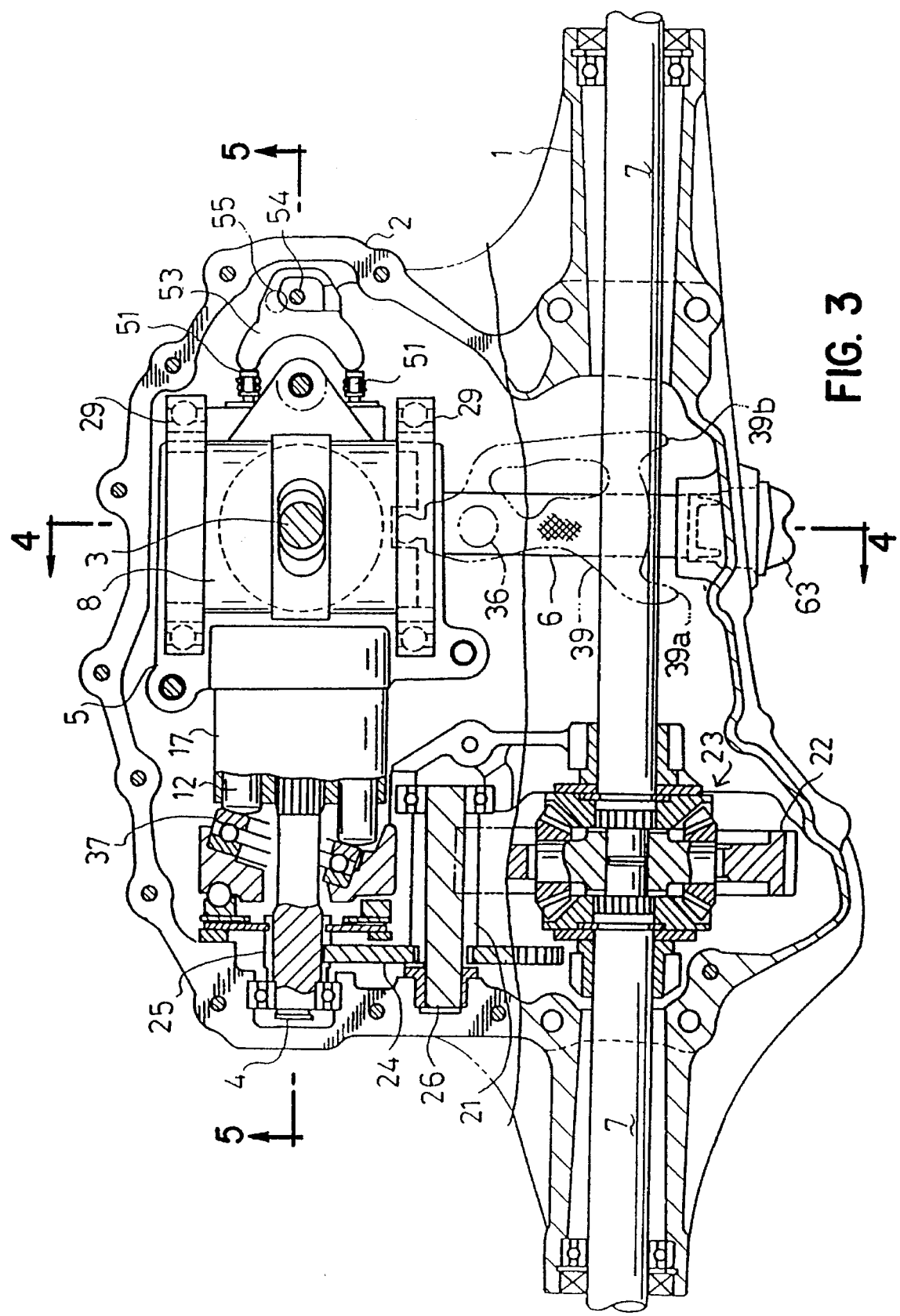
FIG. 3 is a plan view of the axle driving apparatus of FIG. 2 in partial cross section and from which an upper half casing 1 is removed.
Figure 7:
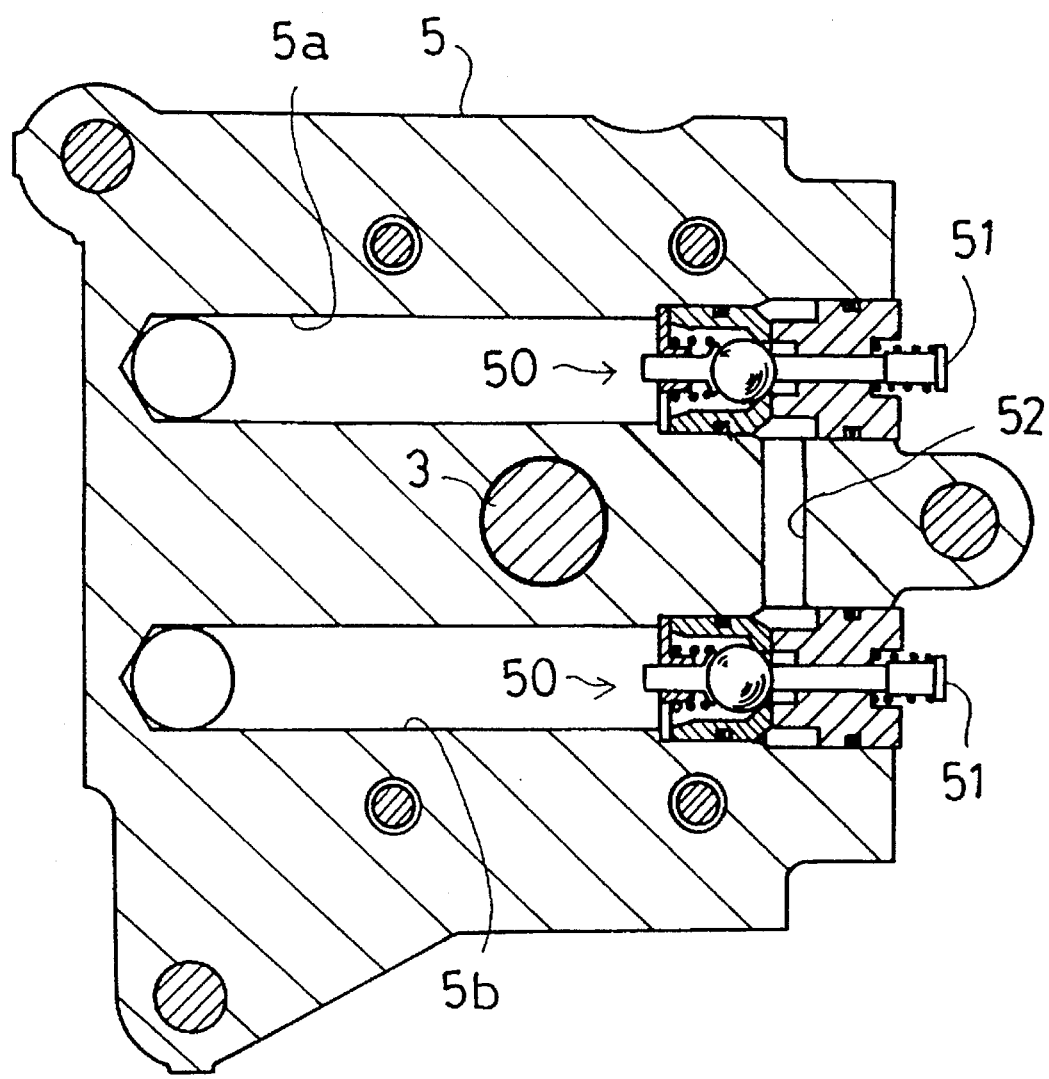
FIG. 7 is a cross-sectional view of the same taken along line 7—7 in FIG. 4.

A pair of oil passages 5a and 5b, extending in parallel to each other as shown in FIGS. 4 and 7, are bored in center section 5. Oil passages 5a and 5b communicate with a pair of kidney ports open on pump mounting surface 40 and with a pair of kidney ports open on motor mounting surface 41, to form a closed circuit for circulating operating oil between the hydraulic pump and the hydraulic motor. Check valves 50 for supplying operating oil are disposed at the open ends of oil passages 5a and 5b. Valves 50 are provided with push pins 51. The outer ends of push pins 51 project from center section 5 and, as shown in FIGS. 3 and 5, abut against a C-shaped by-pass operating member 53. By-pass operating member 53 is linked to a by-pass lever 15 through a cam pin 54 eccentrically fixed to the lower end of by-pass shaft 55. When by-pass lever 15 is rotated, cam pin 54 biases by-pass operating member 53 and simultaneously presses pins 51 to open check valves 50 which releases the closed circuit in the housing, thereby enabling the hydraulic motor to rotate freely.

A pump casing 10 is attached to the lower surface of center section 5 (see FIG. 5). A charging pump 11 for supplying oil into the closed circuit is contained in pump casing 10. An inner gear of charging pump 11 engages with the lower end of power input shaft 3 projecting below the lower surface of center section 5. Power input shaft 3 thereby drives charging pump 11.

Figure 6:
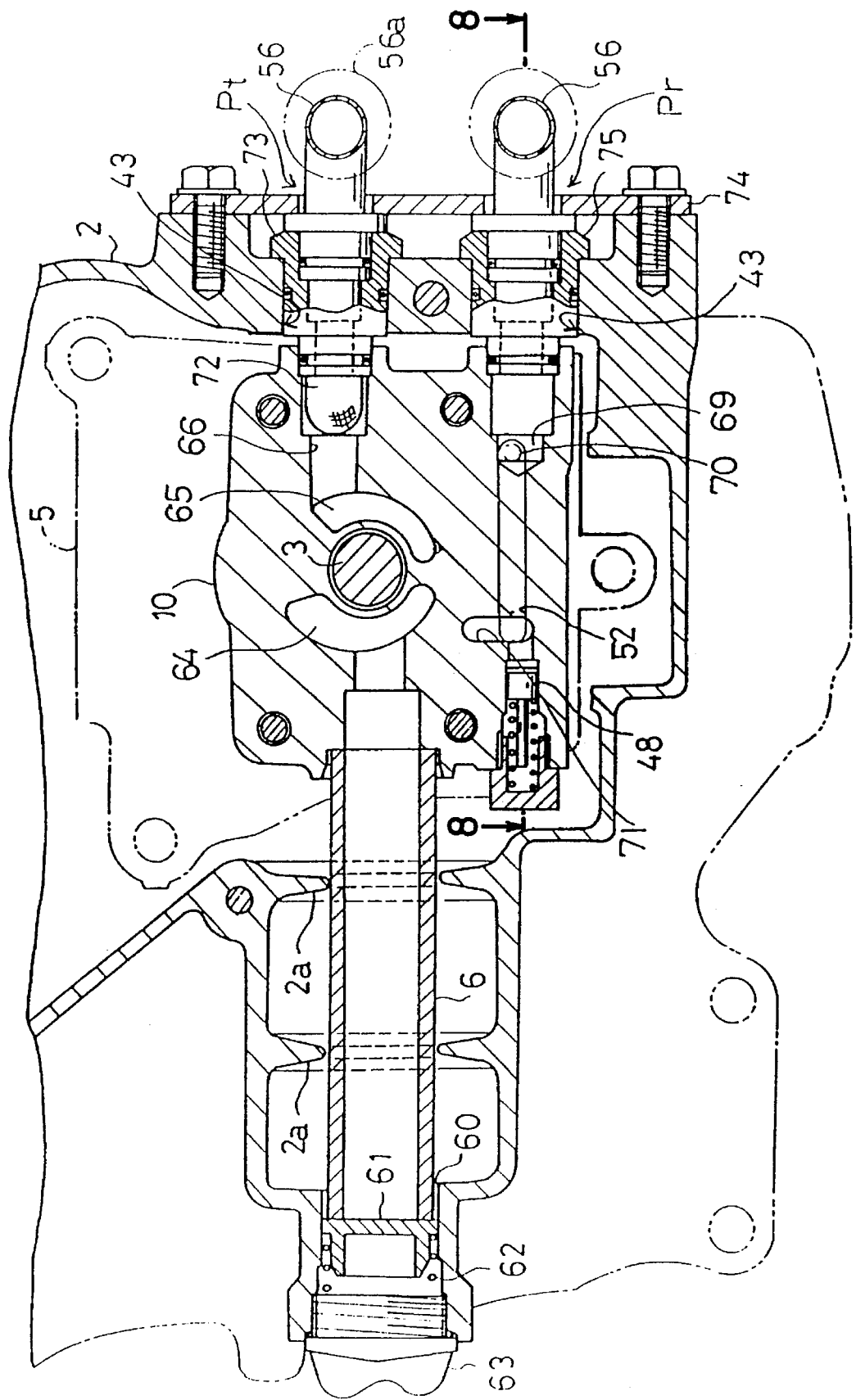
FIG. 6 is a cross-sectional view of the same taken along line 6—6 in FIG. 4.

As shown in FIGS. 4 and 6, oil filtered by an oil filter 6 is introduced into an intake side oil passage 64 formed in pump casing 10. Oil filter 6, comprised of a cylindrical mesh member, is interposed between the side wall of pump casing 10 and the side wall of lower half casing 2. An opening 60 for inserting oil filter 6 from the lateral side of the housing is bored into the side wall of lower half casing 2. A seal cap 63 is fitted onto the outside of opening 60, thereby enabling oil filter 6 to be inspected, cleaned or exchanged with ease. A lid 61 is brought into close contact with the open end of oil filter 6 by a spring 62. Reference numeral 2a designates ribs projecting inwardly from the inner surface of the bottom of lower half casing 2 for supporting oil filter 6.

Figure 10:
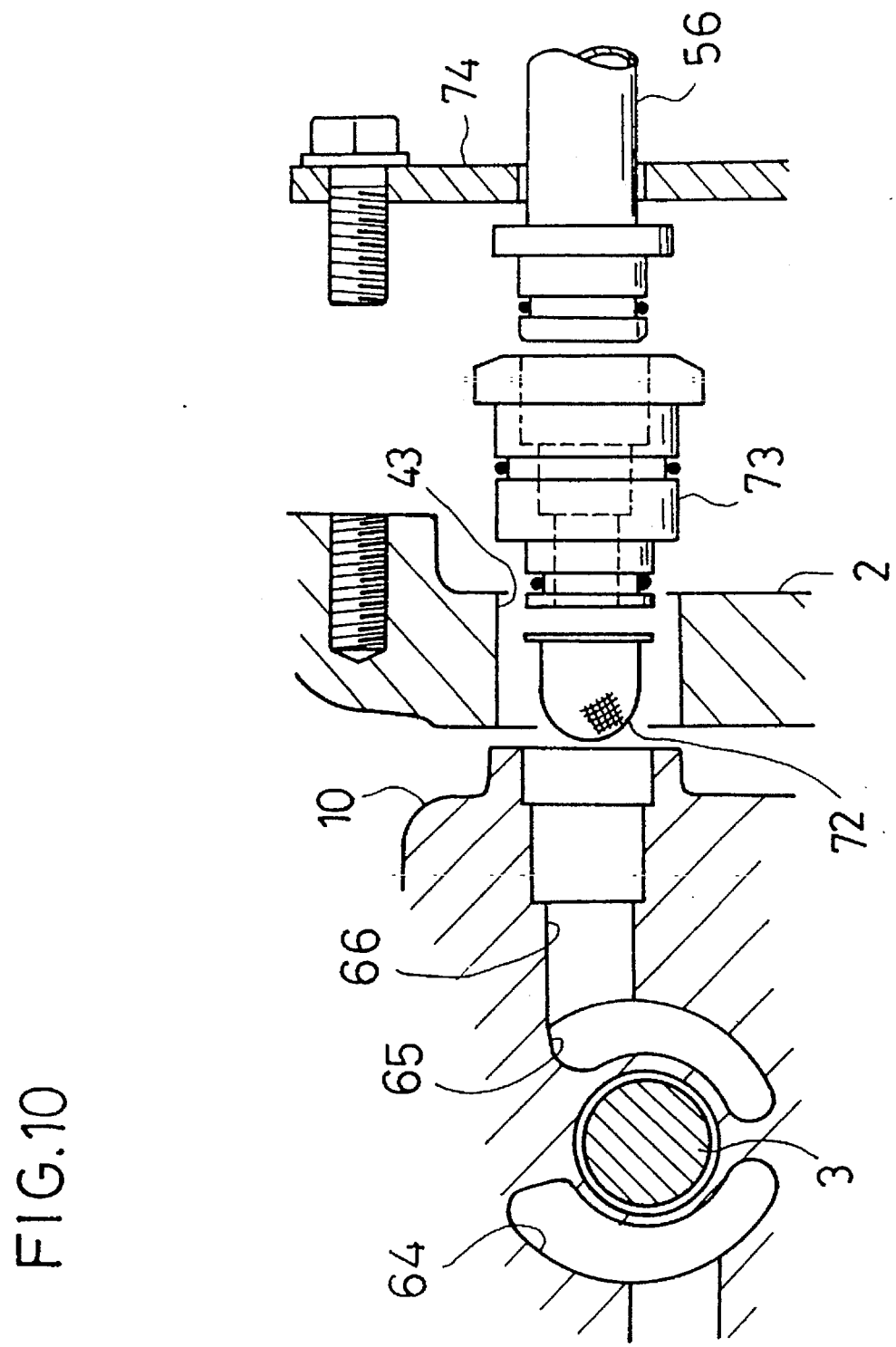
FIG. 10 is an exploded assembly view of the line filter of FIG. 9.

A discharge side oil passage 65 of charging pump 11 is connected through a takeout oil passage 66 with one end of a cooling tube 56 mounted to a takeout port Pt. The takeout port Pt, as shown in FIG. 10, is so constructed that an opening 43 is provided in the lower half casing 2, and a joint 73 is provided at opening 43. At the end of joint 73, inside the housing, there is a line filter 72, which is inserted into oil passage 66. A connector of the cooling tube 56 is inserted into an opening in plate 74 outside the housing. Plate 74 then fixes the connector of cooling tube 56 to the side surface of the housing.

The other end of cooling tube 56 is connected to a return port Pr (see FIG. 6). Return port Pr, like discharge port Pt, comprises a joint 75 which is mounted to an opening 43 in lower half casing 2. Joint 75 is inserted into a return oil passage 69. The connector of cooling tube 56 is inserted into the end of joint 75. Joint 75 is fixed in place by plate 74 which fixes the connector.

As shown in FIG. 10, plate 74 is distinct from lower half casing 2, thereby enabling the removal of joint 73 and the connector for the cooling pipe 56 from pump casing 10. The exchange of line filter 72 and maintenance thereof can be carried out with ease.

Figure 9:
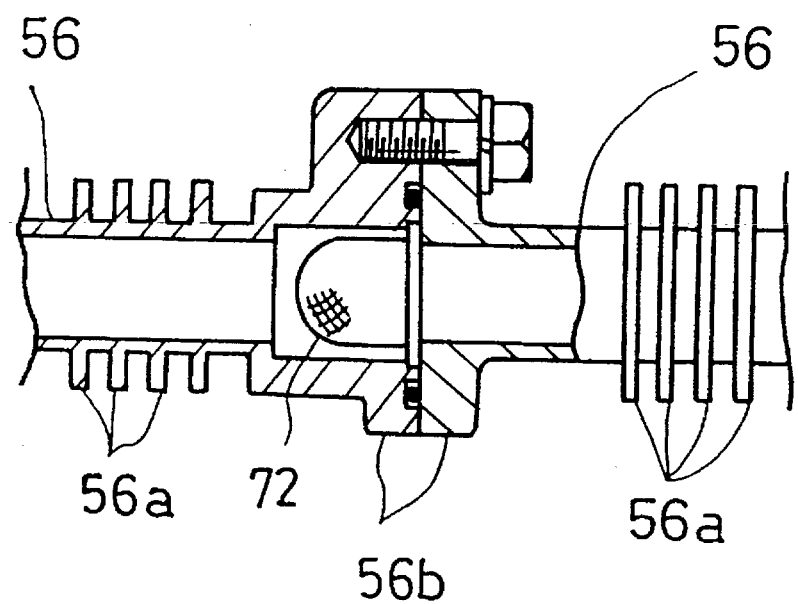
FIG. 9 is a cross-sectional view of a portion of the axle driving apparatus showing a line filter interposed in a cooling tube.

Line filter 72 is used to prevent foreign matter from entering the closed circuit. Its mounting position is not limited to discharge port Pt. As shown in FIG. 9, cooling pipe 56 can be divided halfway with two flanges 56b provided at the abutting ends thereof so that line filter 72 may be interposed therebetween. Line filter 72 may also be provided at return port Pr.

Fins 56a are integrally provided on the outer peripheral surface of cooling tube 56 to create a heat radiation effect. An intermediate portion of cooling tube 56, as shown in FIGS. 2, 4, and 5, is bent in a U-like shape and is disposed between the upper wall of the housing and fan 58, so that a cooling air generated by fan 58 cools the entire housing and cooling tube 56, thereby lowering the temperature of oil therein.

In brief, input pulley 57 rotates power input shaft 3 and drives charging pump 11. Charging pump 11 takes in the oil at a relatively high temperature at intake side oil passage 64 in the housing from oil filter 6. The pressure oil discharged from charging pump 11 is sent from discharge side oil passage 65 to cooling tube 56 through line filter 72 to be cooled by air from fan 58 passing over fins 56a attached to cooling tube 56. The cooled oil reaches return port Pr and enters into the housing to be supplied to the low pressure side of the closed circuit of center section 5 via the operating oil supply passage. Thus, the oil supplied into the hydrostatic transmission is sufficiently cooled so as to prevent a change in oil viscosity or deterioration of volume efficiency of the hydrostatic transmission due to a rise in oil temperature.

Figure 8:
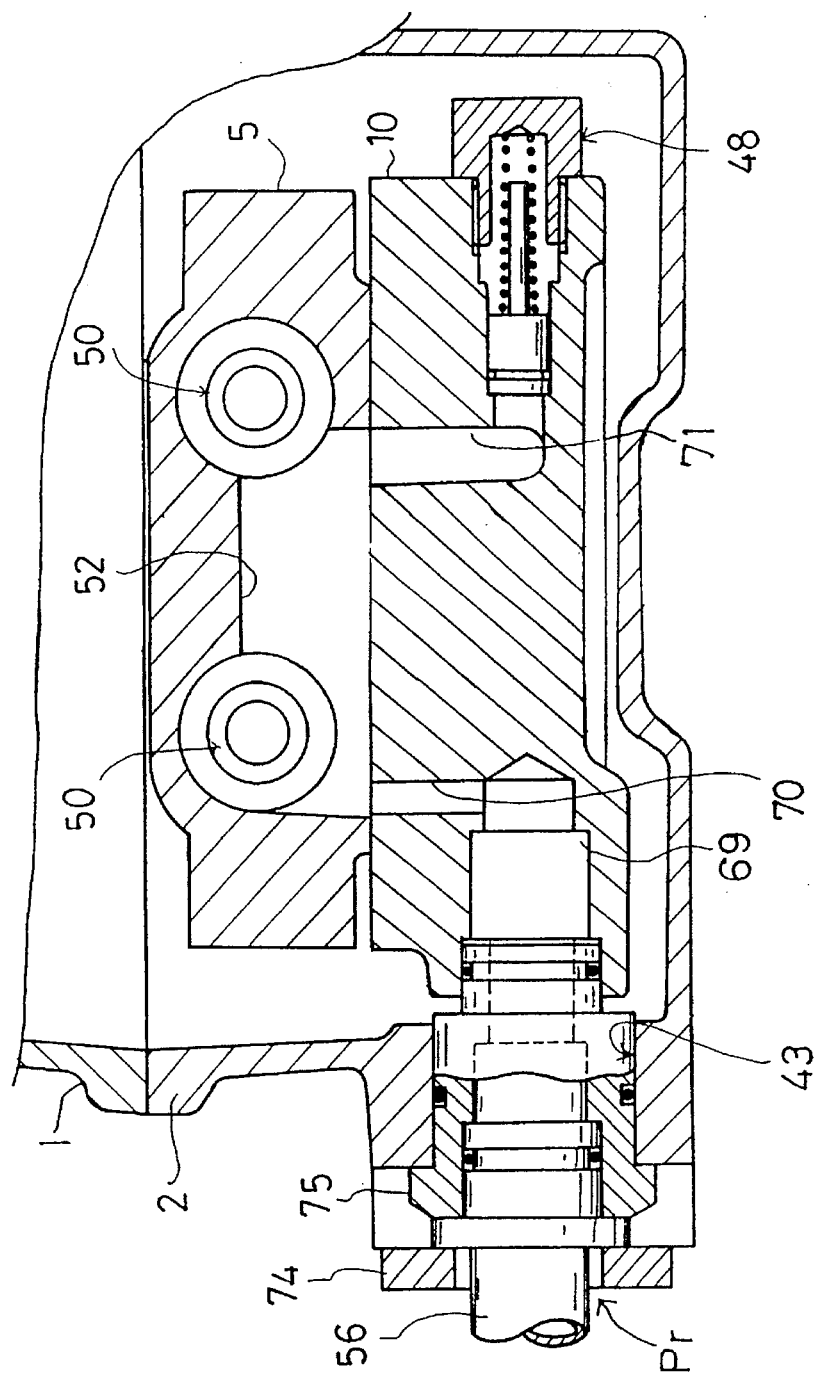
FIG. 8 is a cross-sectional view of the same taken along line 8—8 of FIG. 6.

Center section 5 is provided with one operating oil supply passage 52 for connecting the inlet sides of the check valves 50 to each other (see FIGS. 6 and 8). Operating oil supply passage 52 is formed by an elongate groove open at the mounting surface of pump casing 10. Meanwhile, pump casing 10 is provided with a longitudinal oil passage 70 (see FIG. 8) communicating with return oil passage 69. Longitudinal oil passage 70 is open at the mounting surface of center section 5 and communicates at this location with operating oil supply passage 52. The cooled oil flowing into return port Pr is introduced from oil passage 69 to operating oil supply passage 52 through longitudinal oil passage 70 and reaches both of the inlet sides of check valves 50. One of the check valves 50 at the low pressure side is open so that the cooled oil is supplied into the closed circuit.

A charge relief valve 48 is contained in pump casing 10 in order to adjust pressure of the supplied oil to a predetermined value. Oil flowing in operating oil supply passage 52 is introduced into a longitudinal oil passage 71 at pump casing 10 and is subjected to pressure adjustment of charge relief valve 48. Relief oil discharged therefrom is returned to an oil sump in the housing.

Figure 11:
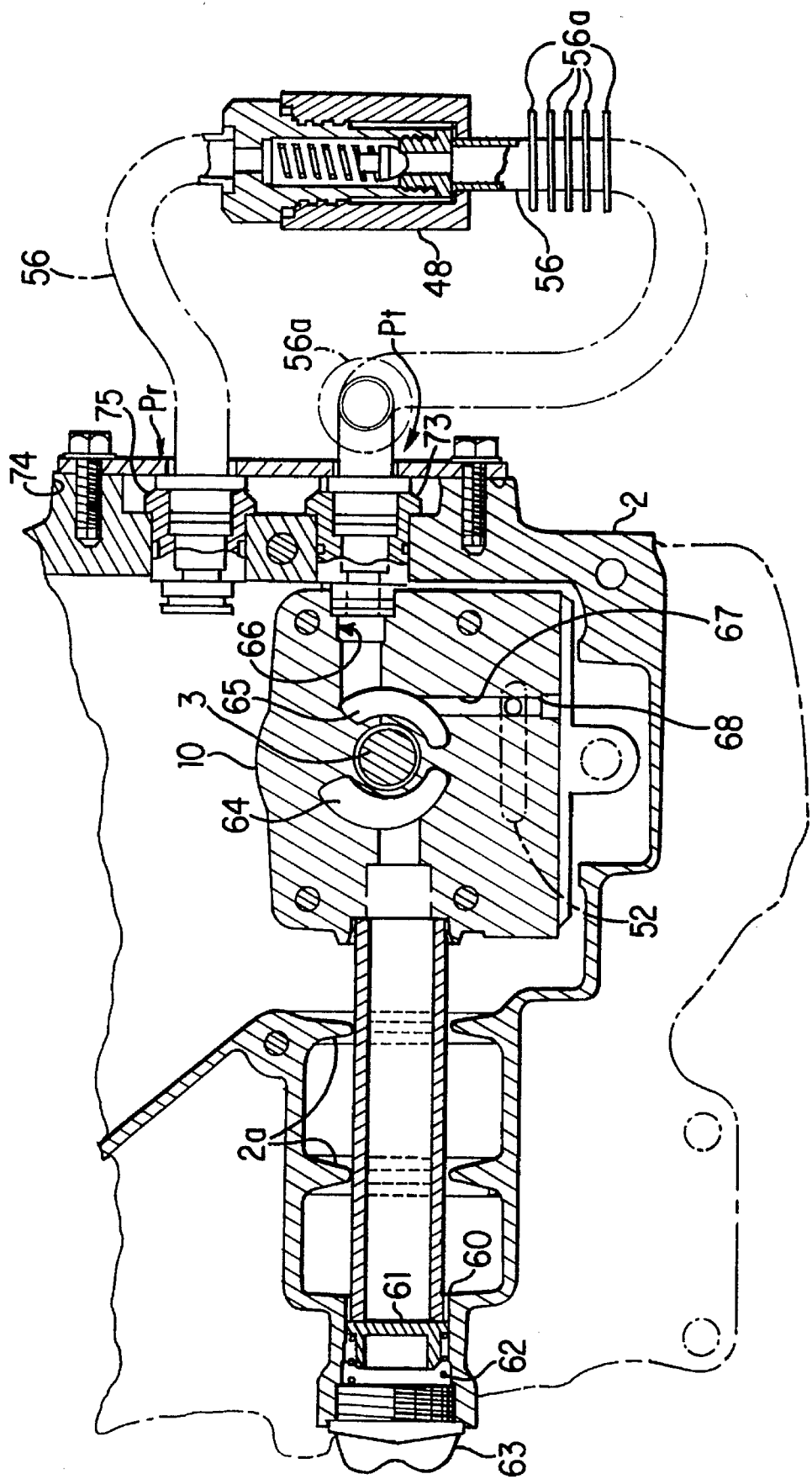
FIG. 11 is a cross-sectional plan view of an alternate embodiment of the present invention which interposes a charge relief valve in the cooling tube.

The mounting position of charge relief valve 48 is not limited to the interior of charging pump casing 10. As shown in FIG. 11, it may be put within cooling tube 56. In this embodiment, oil discharged from intake side oil passage 65 of charging pump 11 is adapted to flow toward cooling tube 56 through discharge port Pt. At the same time, the oil is also introduced into operating oil supply passage 52 in center section 5 through a lateral oil passage 67 and a longitudinal oil passage 68 provided within pump casing 10. The oil reaches both the inlet sides of check valves 50 so that the oil is supplied into the closed circuit through check valve 50 at the low pressure side as mentioned above. In this configuration, there is no need to put line filter 72 at the discharge port Pt. The cooled oil from the return port Pr is returned directly to the oil sump in the housing.

Figure 12:
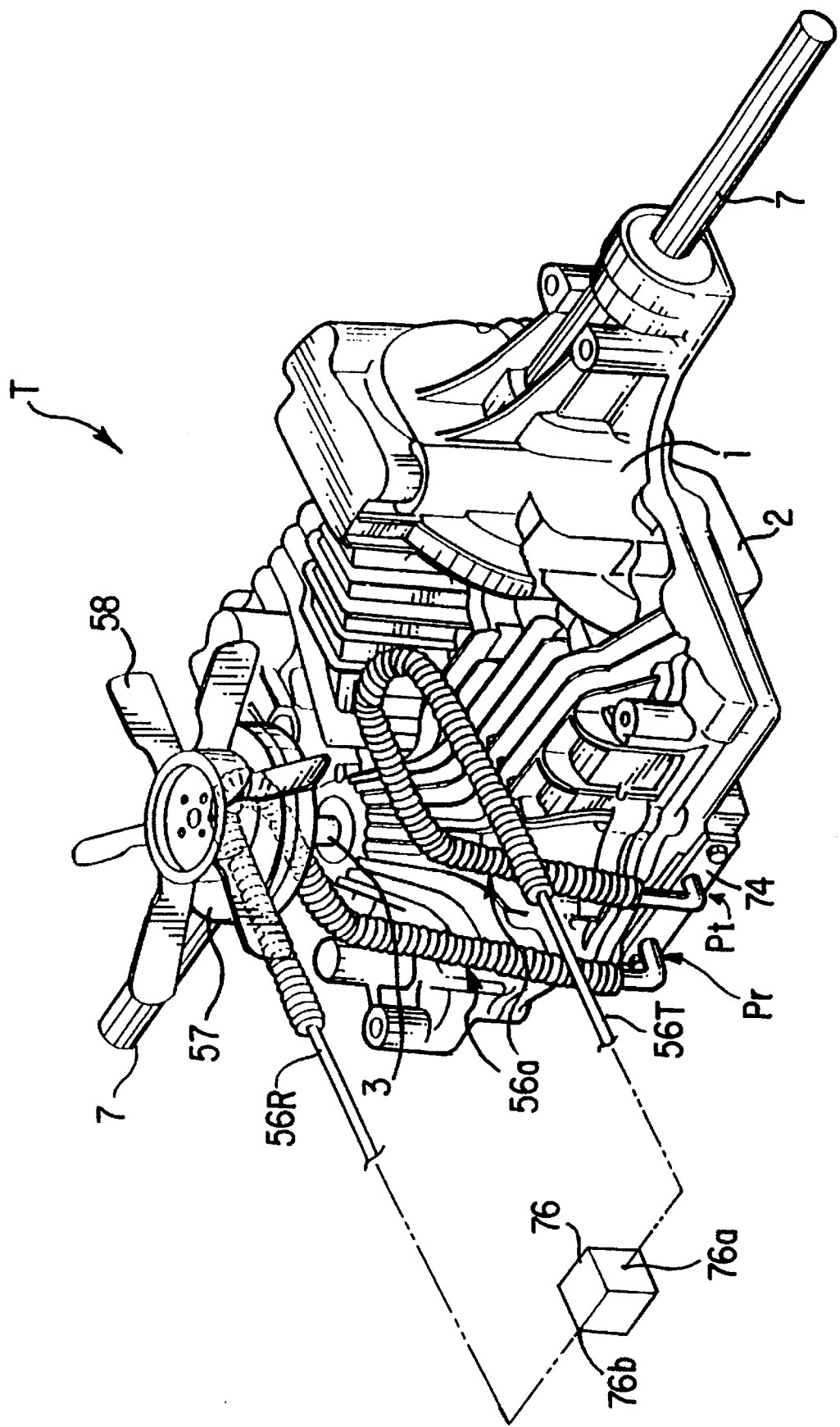
FIG. 12 is a perspective view of another embodiment of the axle driving apparatus of the present invention.
Figure 13:
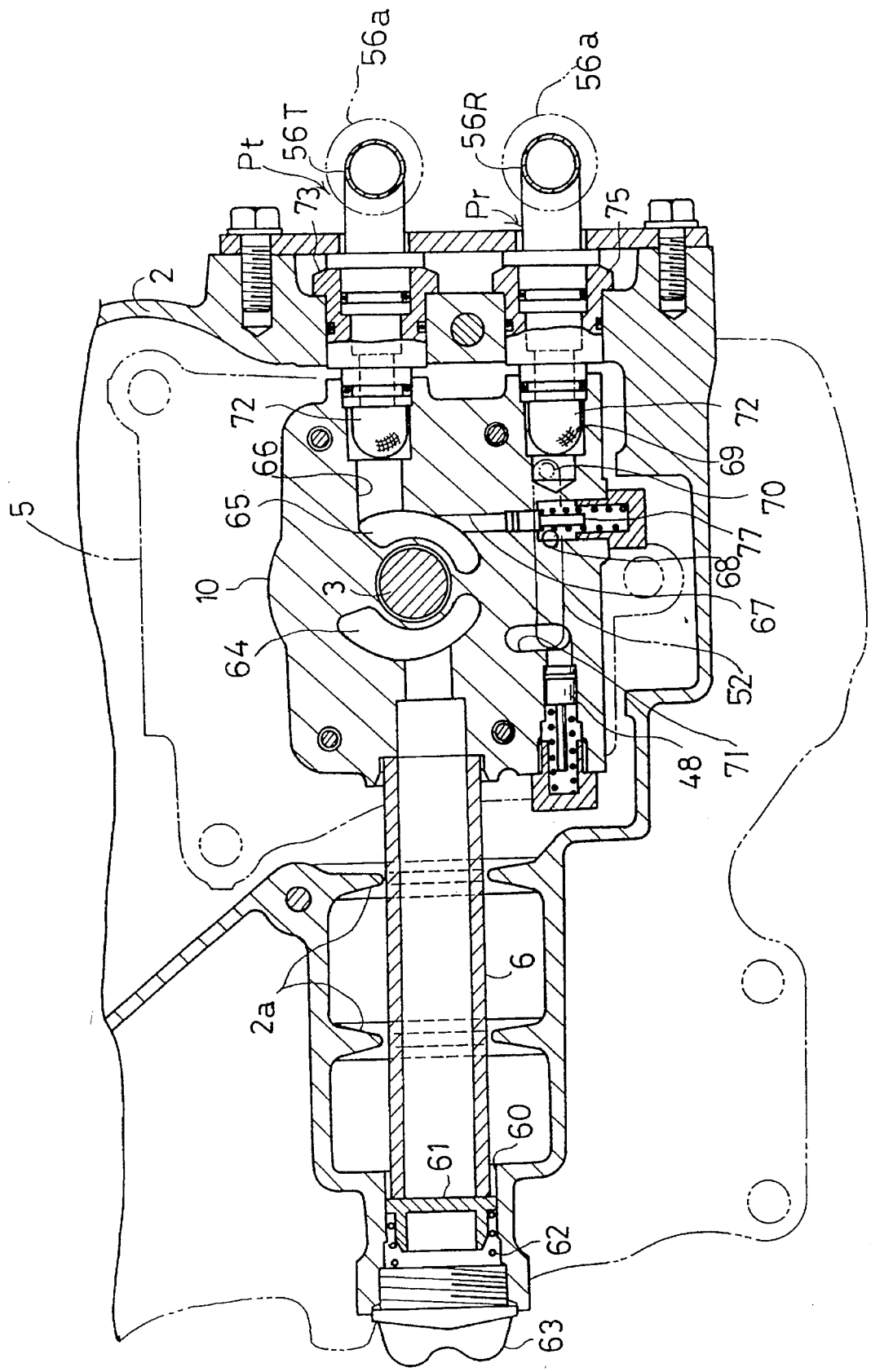
FIG. 13 is a cross-sectional plan view thereof, showing a portion of the charge pump casing for mounting the cooling tube.

A second embodiment of the oil cooling construction of the present invention is described in FIGS. 12 and 13. Although one cooling tube 56 is used in the first embodiment, the second embodiment uses two cooling tubes: a first cooling tube 56T connected at one end to a takeout port Pt and a second cooling tube 56R connected at one end to a return port Pr. The first and second cooling tubes 56T and 56R extend from takeout port Pt and return port Pr along the front wall of the housing, respectively. Each tube is bent to follow the shape of the housing at about a right angle towards fan 58. Below fan 58, the tubes 56 are folded in a U-like shape and then extended toward an external hydraulic actuator 76. First cooling tube 56T connects to an inlet port 76a of the external hydraulic actuator 76 and the second cooling tube 56R connects to an outlet port 76b of the same. This construction uses charging pump 11 as a hydraulic power source for external hydraulic actuator 76. The housing of the axle driving apparatus T is adapted to function as an oil sump for the same.

As it flows from takeout port Pt to external hydraulic actuator 76 through first cooling tube 56T, the oil discharged from charging pump 11 is cooled by air blown from fan 58. After the oil is used to drive external hydraulic actuator 76, it is cooled before returning into the housing by air blown from fan 58 onto second cooling tube 56R. External hydraulic actuator 76 might include, for example, a hydraulic cylinder for lifting a work machine M or for power steering front wheels 27. A large number of fins 56a are provided on the surfaces of first and second cooling tubes 56T and 56R to increase the heat radiating area. This is desirable for increasing the oil cooling efficiency of the tubes.

As shown in FIG. 13, the construction of takeout port Pt from takeout oil passage 66 at pump casing 10 to first cooling tube 56T through a joint 73 is the same as described in the first embodiment in FIGS. 6 and 8. Return port Pr from second cooling tube 56R to return oil passage 69 at pump casing 10 through a joint 75 is also the same. Operating oil supply passage 52 for introducing oil to check valves 50 is the same as well. In order to prevent entrance of foreign matter into the closed circuit, two line filters 72 are interposed in takeout port Pt and return port Pr, respectively.

External hydraulic actuator 76 must be driven at a specified operating oil pressure so that a pressure adjustment can be interposed in lateral oil passage 66 in pump casing 10, which is connected to discharge side oil passage 65. The relief oil discharge from a relief valve 77 during the pressure adjustment is adapted to be introduced into operating oil supply passage 52 at center section 5 through longitudinal oil passage 67. As a result, there is a permanent supply of operating oil to the closed circuit regardless of whether external hydraulic actuator 76 is being driven or not.

External hydraulic actuator 76 can be disposed halfway down cooling tube 56. A temperature rise in the oil after driving external hydraulic actuator 76 will be lowered by cooling tube 56R. Thus, operating oil at a high temperature will not be supplied to the hydrostatic transmission and the transmission's volume efficiency will not deteriorate.

Figure 14:
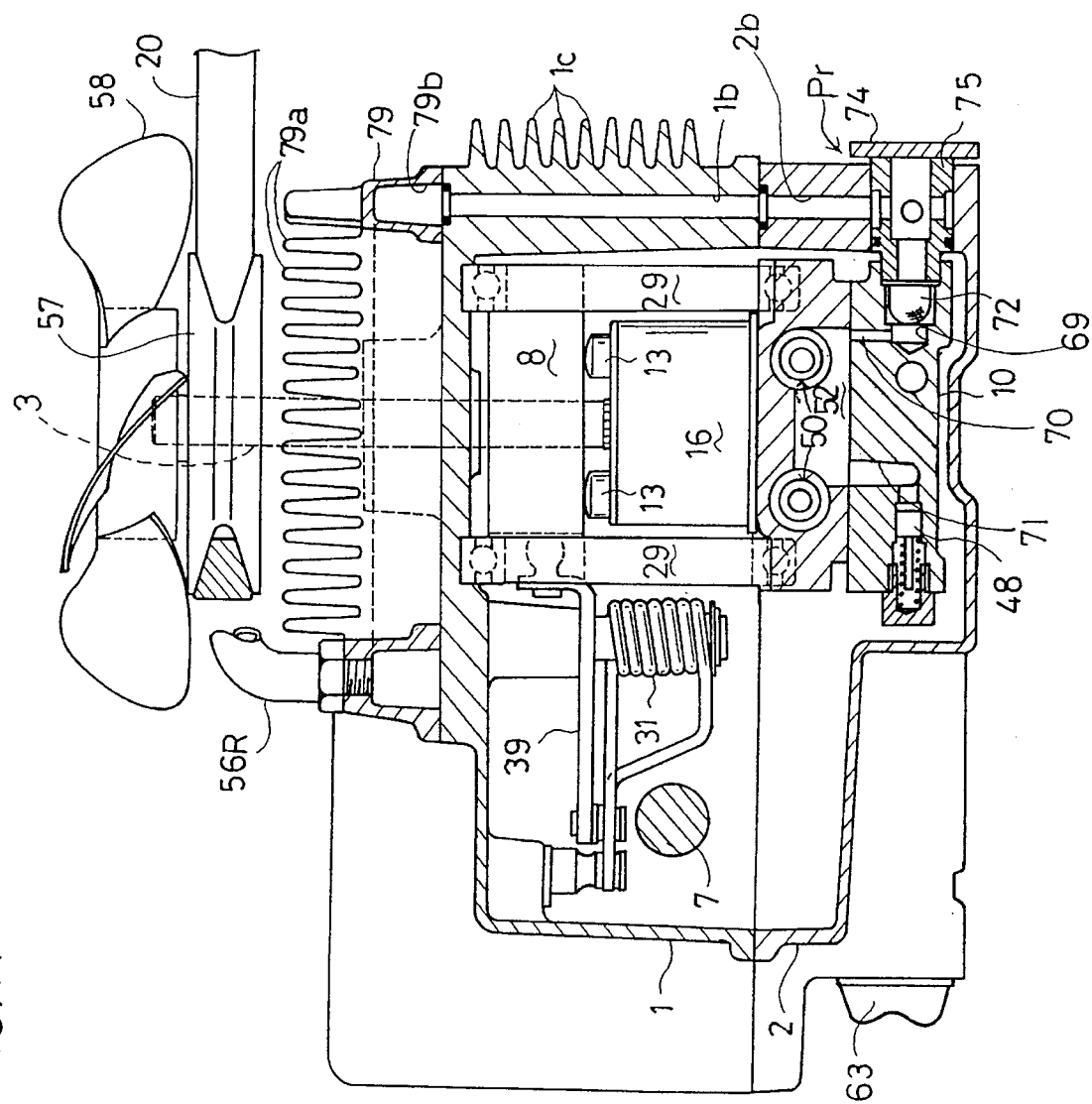
FIG. 14 is a cross-sectional side view of the embodiment of FIG. 12, to which a modified embodiment of the cooling tube is applied.
Figure 15:
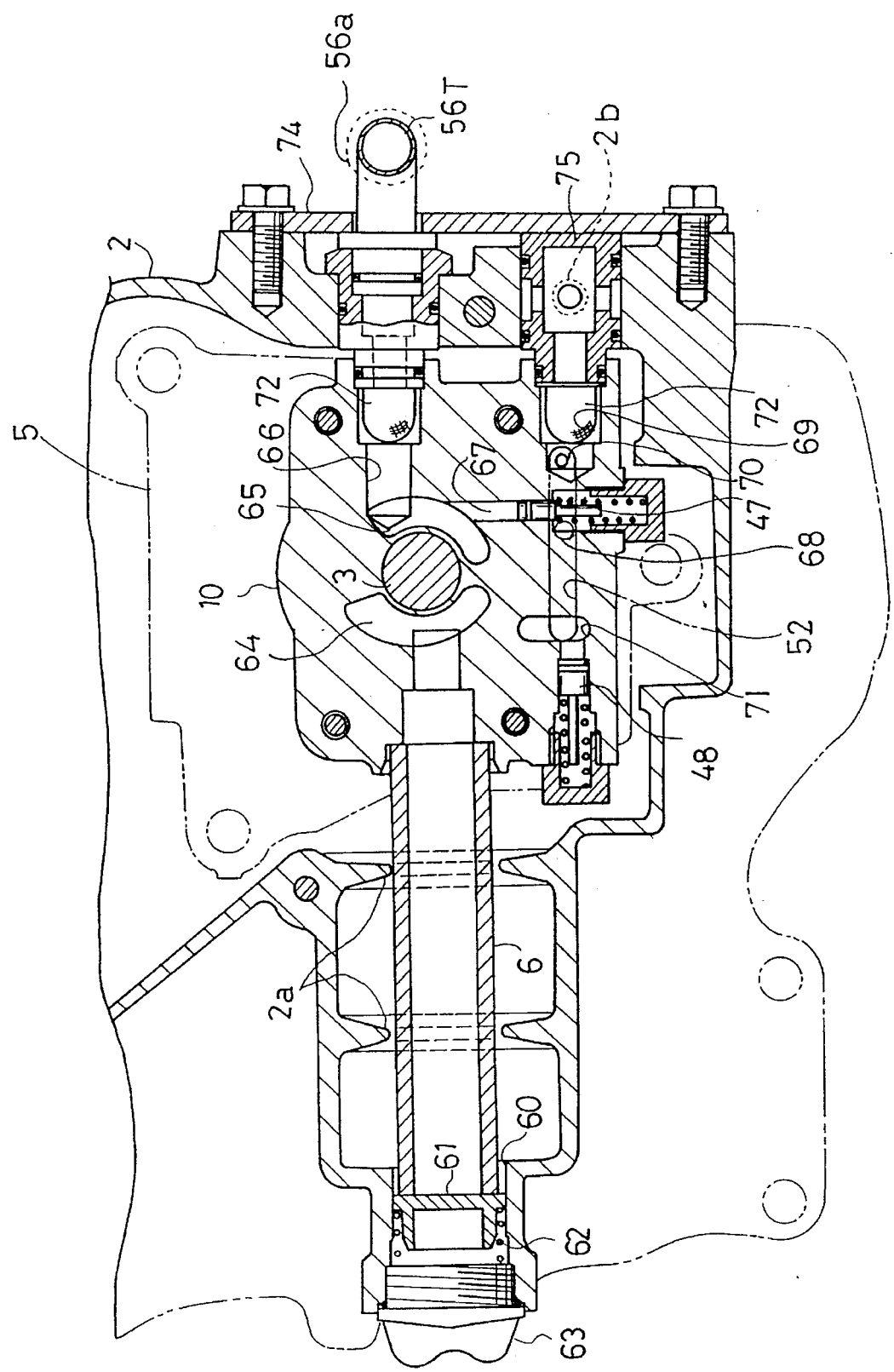
FIG. 15 is a cross-sectional plan view thereof, showing a portion of the charge pump casing for mounting the cooling tube of FIG. 14.

In the second embodiment, the following member can be substituted for part of second cooling tube 56R which carries return oil from external hydraulic actuator 76. As shown in FIGS. 14 and 15, a cover 79 surrounding power input shaft 3 contacts the upper surface of upper half casing 1. A large number of fins 79a are formed on the surface of cover 79. An oil passage 79b is formed along the contact surface in cover 79. Second cooling tube 56R connects with one end of oil passage 79b. Oil passage 1b open on the upper surface of upper half casing 1 connects with the other end of oil passage 79b. Oil passage 1b runs vertically through a thick portion of the front wall of upper half casing 1 and opens at the joint surface with lower half casing 2. A large number of fins 1c project from the surface of the front wall of upper half casing 1 in which oil passage 1b is disposed. Oil passage 1b communicates through the joint surface with one end of an oil passage 2b bored in the thick portion of the front wall of lower half casing 2. The other end of oil passage 2b communicates with return oil passage 69 through joint 75 of return port Pr. In this construction, the oil cooling portion of the return oil passage by the fan is integrally provided within the upper half casing. Thus, the oil cooling construction is strong and will not be damaged easily, and the cooling efficiency can be improved.

Figure 16:
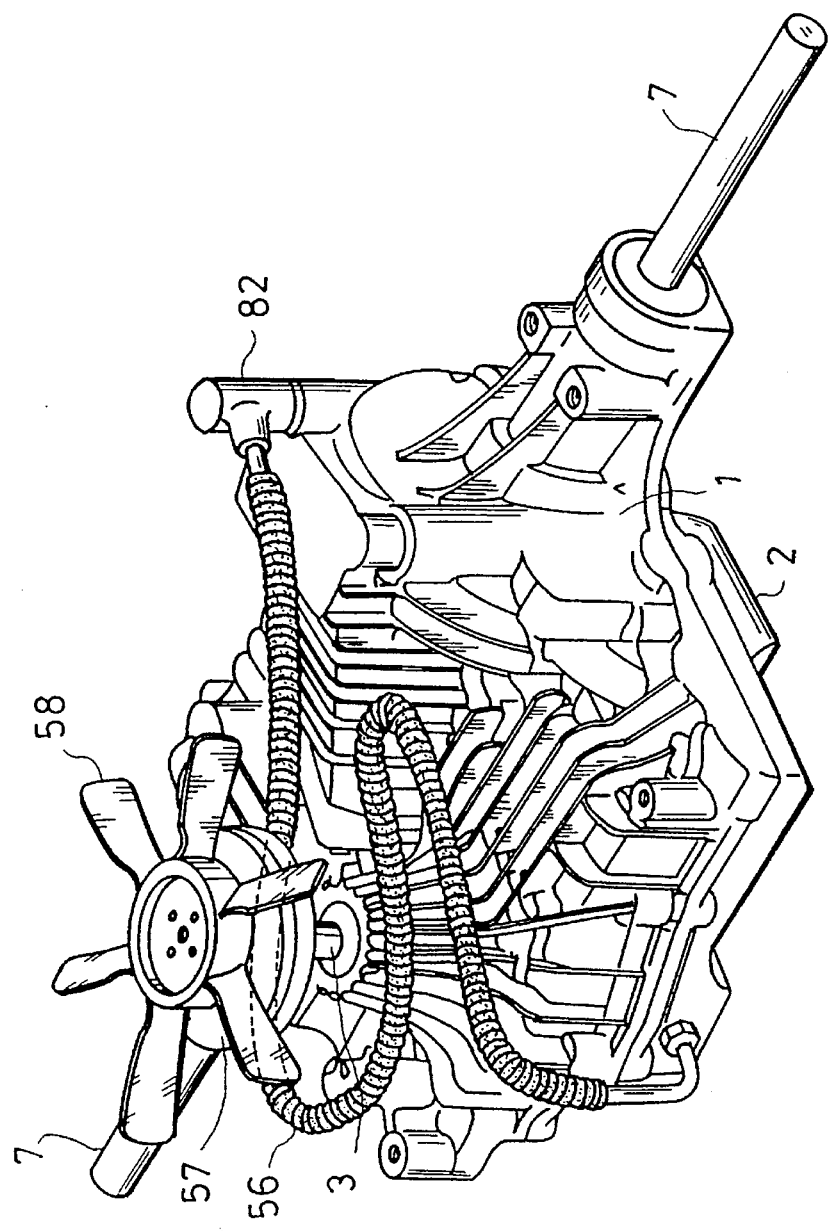
FIG. 16 is a perspective view of another embodiment of the axle driving apparatus of the present invention.
Figure 17:
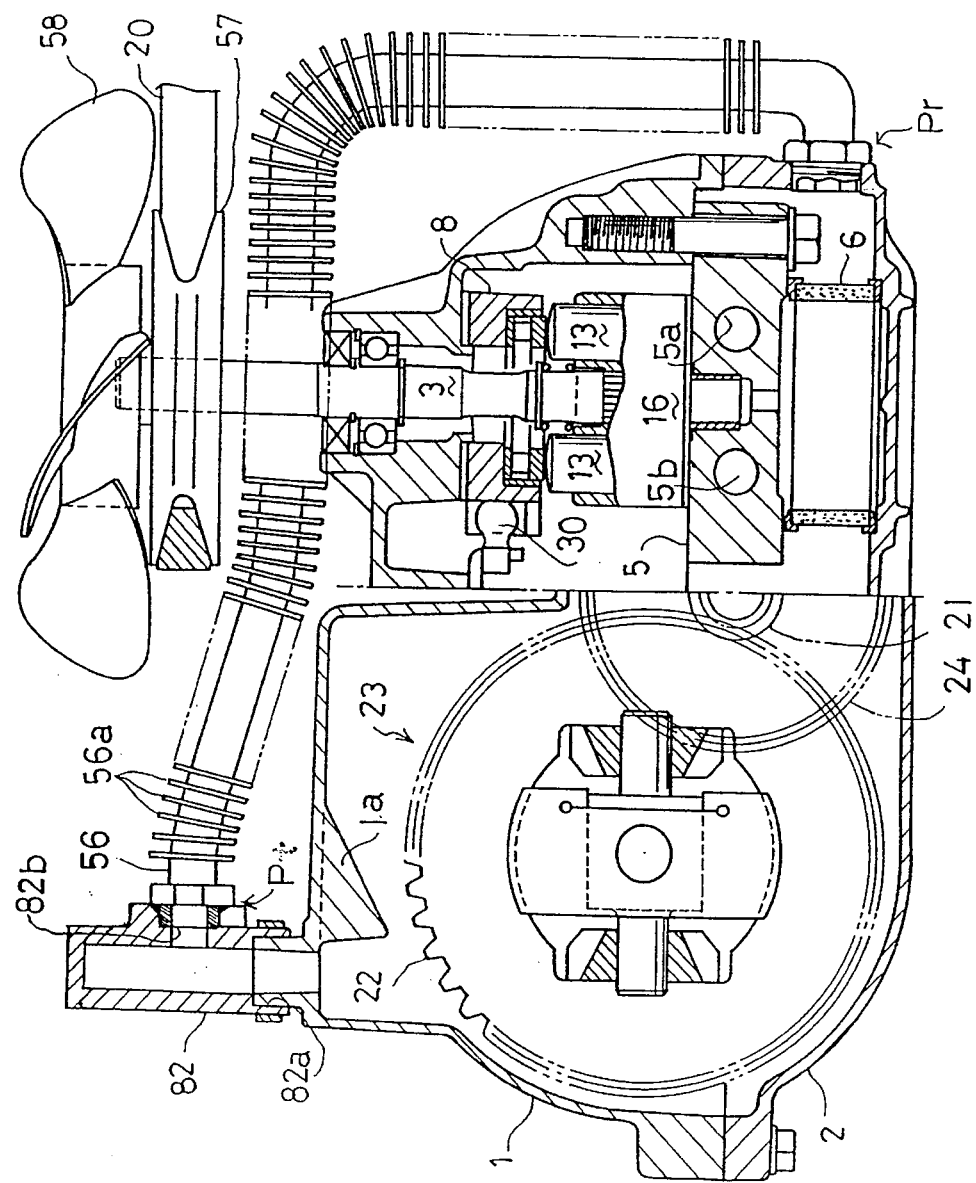
FIG. 17 is a cross-sectional side view of the same.

A third embodiment of the oil cooling construction of the present invention is described in accordance with FIGS. 16 and 17. The aforesaid first and second embodiments forcibly supply the operating oil to the closed circuit of the hydrostatic transmission by charging pump 11. The third embodiment is constructed to enable the operating oil to be supplied by self suction of the hydraulic pump.

The third embodiment is designed so that the hydrostatic transmission of the type that does not use a charging pump is adapted to efficiently cool the oil in the housing and supply it to the hydraulic transmission. A first connection end 82a of a bifurcated joint 82 is mounted on the upper surface of upper half casing 1 near ring gear 22 of differential gear unit 23. A second connection end 82b of the joint thereof constitutes takeout port Pt. One end of cooling tube 56 is mounted thereto.

Cooling tube 56 extends forward along the upper wall of upper half casing 1, passing under fan 58, and bent at about a right angle along the front wall of the housing. It connects with return port Pr provided at the front wall near the bottom of lower half casing 2. Return port Pr provided near oil filter 6 disposed in lower half casing 2.

Filter 6 is ring-shaped and comes into close contact at both openings with the lower surface of center section 5 and the inner bottom surface of lower half casing 2, thereby partitioning the interior and exterior of oil filter 6. An operating oil supply passage (not shown) is open at the lower surface of center section 5 surrounded by oil filter 6, and connects with the inlets of a pair of check valves (not shown) disposed in the closed circuit in center section 5. When the amount of operating oil circulating in the closed circuit decreases and the low pressure side is at negative pressure, the check valve at the low pressure side automatically opens and the filtered oil in oil filter 6 is taken in through the operating oil supply passage (not shown).

When the axle driving apparatus operates to rotate axles 7 in the forward direction, ring gear 22 scrapes up the oil filled in the housing toward first connection end 82a of bifurcated joint 82. Reference numeral 1a designates a rib formed on the inner surface of upper half casing 1 in order to direct the oil flow toward first connection end 82a. Ring gear 22 rotates to apply dynamic pressure to the oil in the housing so that the oil therein circulates from takeout port Pt of bifurcated joint 82 to return port Pr through cooling tube 56.

Halfway along cooling tube 56, in which the oil flows, a large number or fins 56a provided on the surface of cooling tube 56, are hit by air blown from fan 58 so as to reduce the heat of the oil. The cooled oil is returned from return port Pr to the sump in the housing and filtered by oil filter 6 positioned nearby and then supplied to the closed circuit in the center section.

Figure 18:
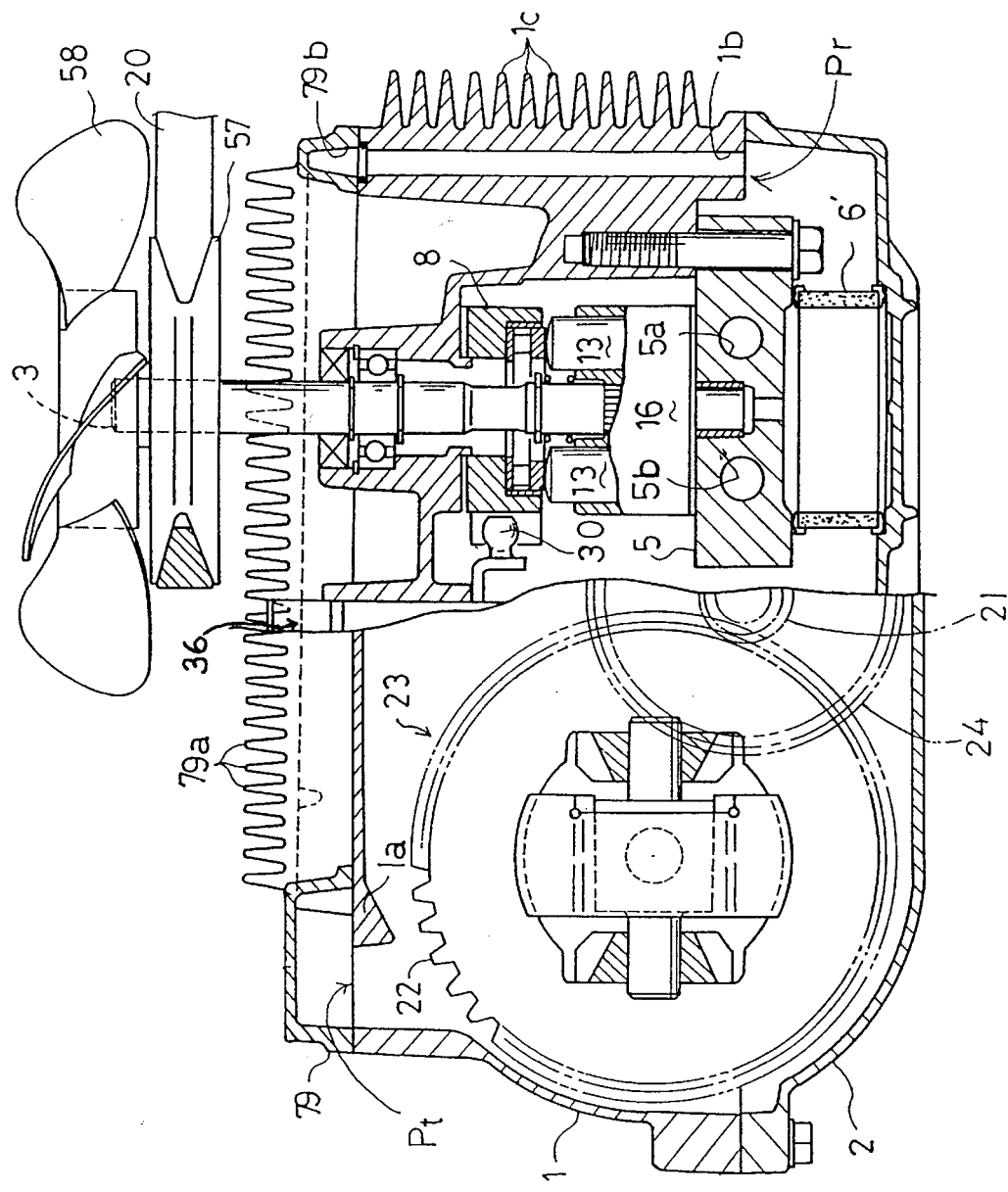
FIG. 18 is a cross-sectional side view of another embodiment of the axle driving apparatus of the present invention, to which a modified example of a cooling tube is applied.

The following members can be substituted for cooling tube 56 in the third embodiment. In detail, as shown in FIG. 18, cover 79 surrounding power input shaft 3 contacts the upper surface of upper half casing 1. A large number of fins 79a are formed on the outer surface of cover 79. An oil passage 79b is formed at the contact surface. The upper surface of upper half casing 1 is open in-part near ring gear 22 so as to constitute takeout port Pt, which is covered by cover 79. Pt connects to one end of oil passage 79b.

An oil passage 1b runs vertically through the thick portion of the front wall of upper half casing 1. One end of passage 1b is open at the upper surface of upper half casing 1 and the other end of the same is open in the oil sump in the housing, thereby forming return port Pr. A large number of fins 1c for heat-radiation are formed at the surface of the front wall of upper half casing 1 where oil passage 1b is positioned. Cover 79 covers the top of oil passage 1b and is open at the upper surface of upper half casing 1, so as to connect oil passage 79b with oil passage 1b.

When the axle driving apparatus operates to rotate axles 7 in the forward direction, ring gear 22 scrapes up the oil filled in the housing toward takeout port Pt. Reference numeral 1a designates a rib formed on the inner surface of upper half casing 1 in order to direct the oil flow toward takeout port Pt. Ring gear 22 rotates to apply dynamic pressure to the oil in the housing so that the oil therein circulates from takeout port Pt to return port Pr through oil passages 79b and 1b.

Along oil passages 79b and 1b in which the oil flows, a large number of fins 79a and 1c, provided at the surfaces of the outer walls of oil passages 79b and 1b, are hit with air blown from fan 58 so that the heat of the oil is reduced. The cooled oil is returned from return port Pr to the oil sump and filtered by oil filter 6 positioned nearby. It is then supplied into the closed circuit in center section 5.

The present invention of the above-mentioned embodiments is applicable not only to an axle driving apparatus having a vertical power input shaft connected to an engine of a vertical crank shaft type, but also to an axle driving apparatus having a horizontal power input shaft connected to an engine of a horizontal crank shaft type.

Although the invention has been described with reference to several different embodiments, these embodiments are merely exemplary and are not limiting of the invention which is defined solely by the appended claims.

What is claimed is:

1. An axle driving apparatus, comprising:

a housing;

an axle disposed in said housing;

a hydrostatic transmission disposed in said housing, including a hydraulic pump driven by a power input shaft and a hydraulic motor for inputting power from a prime mover to drive said axle;

oil disposed in said housing for operating said hydrostatic transmission and for lubricating said axle;

an input pulley provided on said power input shaft;

a fan provided on said power input shaft adjacent to said input pulley; and cooling tubing disposed between said housing and said fan for said oil, wherein said oil in said housing is adapted to flow into said cooling tubing and to be cooled by said fan.

2. An axle driving apparatus as set forth in claim 1, further comprising:

a power transmission element disposed in said housing, wherein said oil flowing in said cooling tubing lubricates said power transmission element.

3. An axle driving apparatus as set forth in claim 1, wherein said oil flowing in said cooling tubing is filled from said housing, and wherein said oil is used as operating oil in said hydrostatic transmission.

4. An axle driving apparatus as set forth in claim 1, wherein said power input shaft extends substantially vertically.

5. An axle driving apparatus as set forth in claim 1, wherein air from said fan cools said input pulley, said cooling tube, and said housing.

6. An axle driving apparatus as set forth in claim 1, wherein said fan is provided on said power input shaft adjacent to an upper portion of said input pulley.

7. An axle driving apparatus, comprising:

a housing;

an axle disposed in said housing;

a hydrostatic transmission disposed in said housing, including a hydraulic pump driven by a power input shaft having a longitudinal axis and a hydraulic motor with a motor shaft having a longitudinal axis for inputting power from a prime mover to drive said axle, wherein said power input shaft drives said hydraulic pump and the longitudinal axis of said power input shaft is perpendicular to the longitudinal axis of said motor shaft;

oil disposed in said housing for operating said hydrostatic transmission and for lubricating said axle;

a fan mounted on said power input shaft of said hydraulic pump; and cooling tubing disposed between said fan and said housing for said oil, wherein said oil in said housing is adapted to flow into said cooling tubing and to be cooled by said fan.

8. An axle driving apparatus as set forth in claim 7, further comprising:

a power transmission element disposed in said housing, wherein said oil flowing in said cooling tubing lubricates said power transmission element.

9. An axle driving apparatus as set forth in claim 8, wherein ends of said cooling tubing communicate with oil disposed in a sump within said housing whereby said oil circulates through said cooling tubing.

10. An axle driving apparatus as set forth in claim 7, wherein said oil flowing in said cooling tubing is filled from said housing, and wherein said oil is used as operating oil in said hydrostatic transmission.

11. An axle driving apparatus as set forth in claim 10, further comprising:

a charging pump disposed in said housing, wherein said oil is discharged from said charging pump.

12. An axle driving apparatus as set forth in claim 11, further comprising:

a discharge side oil passage from said charging pump;

an operating oil supply passage fluidly connected to said hydrostatic transmission;

wherein one end of said cooling tubing fluidly connects with said discharge side oil passage from said charging pump; and wherein another end of said cooling tubing fluidly connects with said oil supply passage to said hydrostatic transmission.

13. An axle driving apparatus as set forth in claim 12, further comprising:

a line filter disposed between said cooling tubing and said operating oil supply passage to said hydrostatic transmission.

14. An axle driving apparatus as set forth in claim 7, further comprising an input pulley provided on said power input shaft, wherein said input pulley rotates as one unit with said fan.

15. An axle driving apparatus as set forth in claim 14, wherein air from said fan cools said input pulley, said cooling tube, and said housing.

16. An axle driving apparatus, comprising:

a housing;

an axle disposed in said housing;

a hydrostatic transmission disposed in said housing, including a hydraulic pump driven by a power input shaft and a hydraulic motor, for inputting power from a prime mover to drive said axle;

oil disposed in said housing for operating said hydrostatic transmission and for lubricating said axle;

a fan mounted on said power input shaft; and an oil passage formed in said housing for cooling said oil;

wherein said fan cools said oil disposed in said oil passage.

17. An axle driving apparatus as set forth in claim 16, further comprising:

a power transmission element disposed in said housing, wherein said oil flowing in said oil passage lubricates said power transmission element.

18. An axle driving apparatus as set forth in claim 16, wherein said oil flowing in said oil passage is filled from said housing, and wherein said oil is used as operating oil in said hydrostatic transmission.

19. An axle driving apparatus as set forth in claim 16, wherein said power input shaft extends substantially vertically.

20. An axle driving apparatus as set forth in claim 16, further comprising:

a casing oil passage disposed in said casing, wherein said oil flows from said oil passage to said housing through said casing oil passage.

21. An axle driving apparatus as set forth in claim 20, further comprising:

fins for heat radiation disposed on the surface of an outer wall of said casing oil passage.

22. An axle driving apparatus as set forth in claim 16, further comprising an input pulley provided on said power input shaft, wherein said input pulley rotates as one unit with said fan.

23. An axle driving apparatus as set forth in claim 22, wherein air from said fan cools said input pulley, said cooling tube, and said housing.

24. An axle driving apparatus, comprising:

a housing;

an axle disposed in said housing;

a hydrostatic transmission disposed in said housing, including a hydraulic pump driven by a power input shaft having a longitudinal axis and a hydraulic motor with a motor shaft having a longitudinal axis, for inputting power from a prime mover to drive said axle, wherein said power input shaft drives said hydraulic pump and the longitudinal axis of said power input shaft is perpendicular to the longitudinal axis of said motor shaft;

oil disposed in said housing for operating said hydrostatic transmission and for lubricating said axle;

a fan mounted on said power input shaft; and an oil passage disposed between said fan and said housing for cooling said oil;

wherein said oil in said housing is adapted to flow into said oil passage and to be cooled by said fan.

25. An axle driving apparatus as set forth in claim 24, further comprising:
a cover wherein said oil passage is disposed in said cover.

26. An axle driving apparatus as set forth in claim 25, further comprising:
fins for heat radiation disposed on the surface of an outer wall of said cover.

27. An axle driving apparatus as set forth in claim 24, further comprising:
a power transmission element disposed in said housing, wherein said oil flowing in said oil passage lubricates said power transmission element.

28. An axle driving apparatus as set forth in claim 27; wherein ends of said oil passage communicate with oil disposed in a sump within said housing whereby said oil circulates through said oil passage.

29. An axle driving apparatus as set forth in claim 24, wherein said oil flowing in said oil passage is filled from said housing, and wherein said oil is used as operating oil in said hydrostatic transmission.

30. An axle driving apparatus as set forth in claim 29, further comprising:
a charging pump disposed in said housing, wherein said oil is discharged from said charging pump.

31. An axle driving apparatus as set forth in claim 24, further comprising an input pulley provided on said power input shaft, wherein said input pulley rotates as one unit with said fan.

32. An axle driving apparatus as set forth in claim 31, wherein air from said fan cools said input pulley, said cooling tube, and said housing.

33. An axle driving apparatus, comprising:
a housing;
oil disposed in said housing;
an axle disposed in said housing;
a hydrostatic transmission disposed in said housing, including a hydraulic pump driven by a power input shaft and a hydraulic motor for inputting power from a prime mover to drive said axle;
a fan mounted on said power input shaft;
a cover disposed between said fan and said housing and fixed on said housing; and
an oil passage disposed in said cover for cooling said oil, wherein said oil in said housing is adapted to flow into said passage.

34. An axle driving apparatus as set forth in claim 33, further comprising:
a power transmission element disposed in said housing, wherein said oil flowing in said oil passage lubricates said power transmission element.

35. An axle driving apparatus as set forth in claim 33, wherein said oil flowing in said oil passage is filled from said housing, and wherein said oil is used as operating oil in said hydrostatic transmission.

36. An axle driving apparatus as set forth in claim 33, wherein said power input shaft extends substantially vertically.

37. An axle driving apparatus as set forth in claim 33, further comprising an input pulley provided on said power input shaft, wherein said input pulley rotates as one unit with said fan.

38. An axle driving apparatus as set forth in claim 37, wherein air from said fan cools said input pulley, said cooling tube, and said housing.

* * * * *